(12) United States Patent
Jackson et al.

(10) Patent No.: US 7,874,197 B2
(45) Date of Patent: Jan. 25, 2011

(54) MEASURING LIQUID FLOW RATE FROM A NOZZLE

(75) Inventors: Ken Jackson, Saskatoon (CA); Gary E. Gunthorpe, Calgary (CA)

(73) Assignee: ATI Agritronics Inc., Saskatoon, Saskatchewan (CA)

( * ) Notice: Subject to any disclaimer, the term of this patent is extended or adjusted under 35 U.S.C. 154(b) by 195 days.

(21) Appl. No.: 12/371,977

(22) Filed: Feb. 17, 2009

(65) Prior Publication Data

US 2009/0205402 A1 Aug. 20, 2009

(30) Foreign Application Priority Data

Feb. 20, 2008 (CA) .................................. 2622046

(51) Int. Cl.
*G01F 25/00* (2006.01)
*G01F 23/26* (2006.01)
*G01F 1/00* (2006.01)

(52) U.S. Cl. .................... 73/1.73; 73/304 C; 73/861
(58) Field of Classification Search .................. 73/1.73, 73/1.74, 1.31, 861, 304 C
See application file for complete search history.

(56) References Cited

U.S. PATENT DOCUMENTS

| 3,831,446 | A | * | 8/1974 | Dye ............................. 73/861 |
| 3,859,854 | A | * | 1/1975 | Dye et al. ...................... 73/215 |
| 4,051,431 | A | * | 9/1977 | Wurster ......................... 73/861 |
| 4,395,918 | A | * | 8/1983 | Wilson .......................... 73/861 |
| 4,397,189 | A | * | 8/1983 | Johnson et al. ................ 73/861 |
| 4,409,845 | A | * | 10/1983 | Stufflebam et al. ............ 73/861 |
| 4,723,437 | A | * | 2/1988 | McKenzie .................. 73/1.26 |
| 4,896,539 | A | * | 1/1990 | Salyani et al. ................ 73/861 |
| 4,964,307 | A | * | 10/1990 | Bryce ........................... 73/861 |
| 5,103,368 | A | * | 4/1992 | Hart ........................... 361/284 |
| 6,016,697 | A | * | 1/2000 | McCulloch et al. ........ 73/304 C |
| 7,469,570 | B2 | * | 12/2008 | Cooper ........................ 73/1.73 |

* cited by examiner

*Primary Examiner*—John Fitzgerald
(74) *Attorney, Agent, or Firm*—Oppenheimer Wolff & Donnelly LLP

(57) ABSTRACT

An apparatus for measuring a rate of liquid flow through a spray nozzle includes a container with an opening in a top thereof adapted to receive a liquid discharge from a spray nozzle. A level sensor comprises an electrical capacitor oriented substantially vertically in the container and configured such that as liquid rises in the container, a capacitance of the capacitor changes. A processor circuit is connected to the capacitor and is operative to measure the change in capacitance of the capacitor and convert the change in capacitance into a rate of liquid flow into the container, and a display is operative to display the rate of liquid flow. The apparatus is applicable to an agriculture or industrial application whereby an operator can periodically check the flow to determine wear or plugging of a spray nozzle.

22 Claims, 5 Drawing Sheets

MEASURING LIQUID FLOW RATE FROM A NOZZLE

CROSS REFERENCE TO RELATED APPLICATIONS

FIELD OF THE INVENTION

The present invention relates to apparatus and methods for measuring, storing, and displaying a measurement of the rate at which a liquid is flowing from a spray nozzle.

BACKGROUND OF THE INVENTION

It is known that liquid spray nozzles become enlarged with time and may develop partial blockages. A considerable amount of time is required to check these nozzles by measuring time and amount that is caused to flow into a container. In the case of agricultural spraying too much or too little flow has significant economic &/or environmental impact.

BRIEF SUMMARY OF THE INVENTION

It is an object of the present invention to provide an apparatus and method for measuring a rate of liquid flow through a spray nozzle that overcomes problems in the prior art.

In a first embodiment the present invention provides an apparatus for measuring a rate of liquid flow through a spray nozzle. The apparatus comprises a container with an opening in a top thereof adapted to receive a liquid discharge from a spray nozzle. A level sensor comprises an electrical capacitor oriented substantially vertically in the container and configured such that as liquid rises in the container, a capacitance of the capacitor changes. A processor circuit is connected to the capacitor and is operative to measure the change in capacitance of the capacitor and convert the change in capacitance into a rate of liquid flow into the container, and a display is operative to display the rate of liquid flow.

In a second embodiment the present invention provides a method for measuring a rate of liquid flow through a spray nozzle. The method comprises providing a container with an opening in a top thereof and directing liquid discharge from a spray nozzle into the opening; providing a level sensor comprising an electrical capacitor oriented substantially vertically in the container and configured such that as liquid rises in the container, a capacitance of the capacitor changes; with a processor circuit connected to the capacitor, measuring the change in capacitance of the capacitor and converting the change in capacitance into a to rate of liquid flow into the container; and displaying the rate of liquid flow.

The present invention allows the operator to rapidly and accurately measure the flow from each nozzle in a spraying system. The operator simply holds the device at the output of each nozzle until a valid measurement is displayed, dumps the collected liquid then proceeds to the next nozzle.

Capacitive sensors are used extensively for level measurement and proximity detection. This invention utilizes a capacitive sensor consisting of a metallic tube containing an insulated metallic wire centered down its length. The liquid is caused to enter a container in which the sensor is affixed. The capacitance between the wire and tube is measured. As the liquid enters the bottom of the tube and rises the capacitance changes due the fact the liquid (usually water) has a significantly high dielectric then air.

The rate of change, which is directly related to the rate of rise of the liquid, is measured and scaled to the flow rate of the liquid entering the container.

It is known that if all of the output from a spray nozzle is made to enter a container of fixed geometry, the rate of rise of the liquid in the container is directly proportional to the flow rate and geometry of the container. It is also known that dielectric constant of water is much higher then air. The capacitance between two metal surfaces is proportional to the surface area and the dielectric of the media in between. Therefore as the liquid rises, the capacitance will change proportionately.

In the preferred embodiment of the invention, two metallic surfaces are permanently mounted in a cup like container. One surface is a tube and the other is an insulated wire or rod mounted down the center of the tube.

A funnel is mounted down the middle of the cup to direct the flow and to minimize turbulence caused by the rapid flow of liquid into the confined space.

Circuits are provided to measure the capacitance and scale the value to the flow rate of liquid into the cup based on the shape of the cup. These circuits also contain visual display devices, keypads and data storage devices.

Further circuits are provided to down load the data into a computer for long term storage and trend analysis. Further circuits maybe provided to allow the device to measure the pressure of the liquid entering the nozzle.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE INVENTION

The nozzle flow measuring apparatus of the present apparatus includes one or more capacitive sensors, connected through the wall of a container, via a seal, to controller circuits which converts the change in capacitance measurement to rate of flow, stores and displays it.

Figure 1:
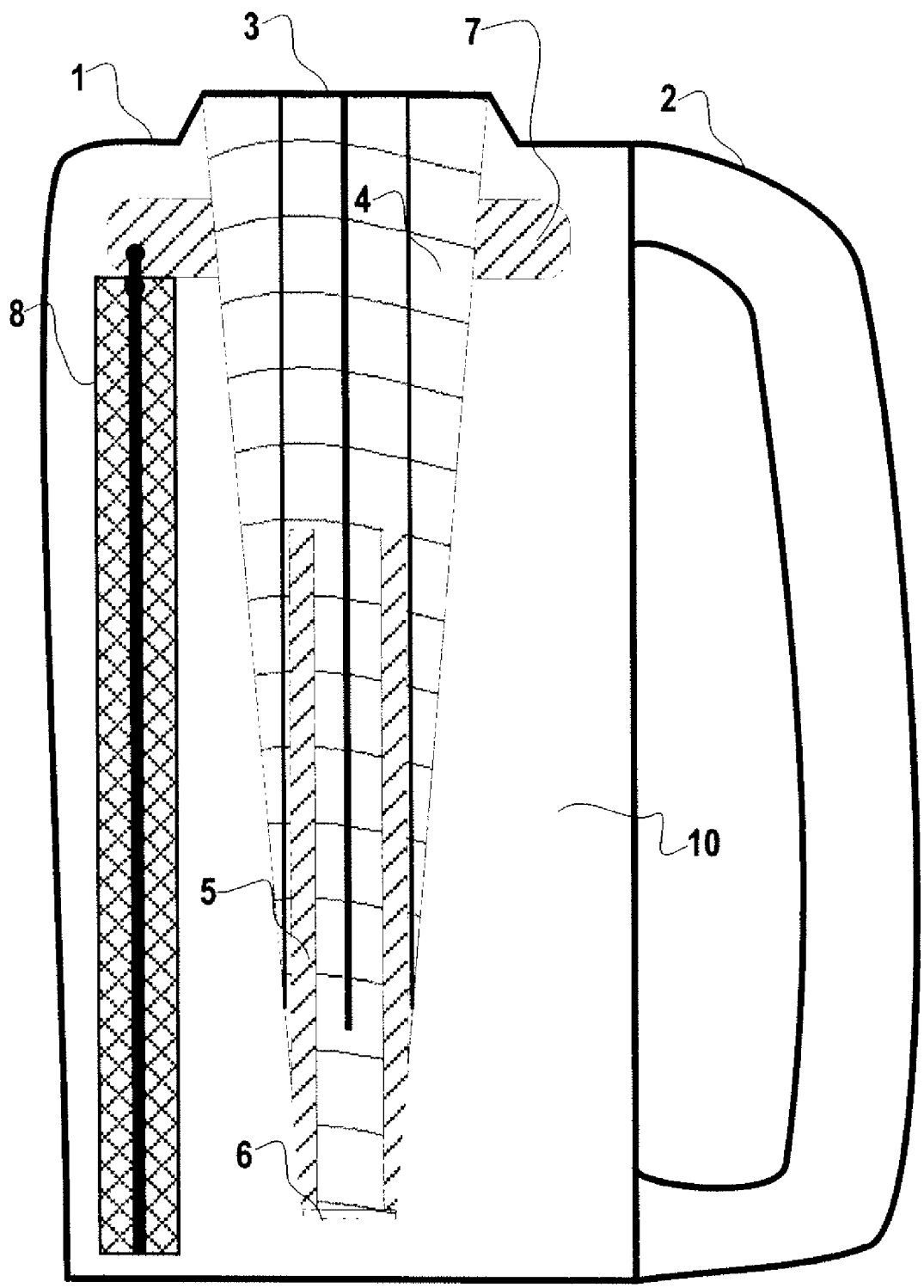
FIG. 1 is a schematic sectional front view of an embodiment of an apparatus of the present invention.
Figure 2:
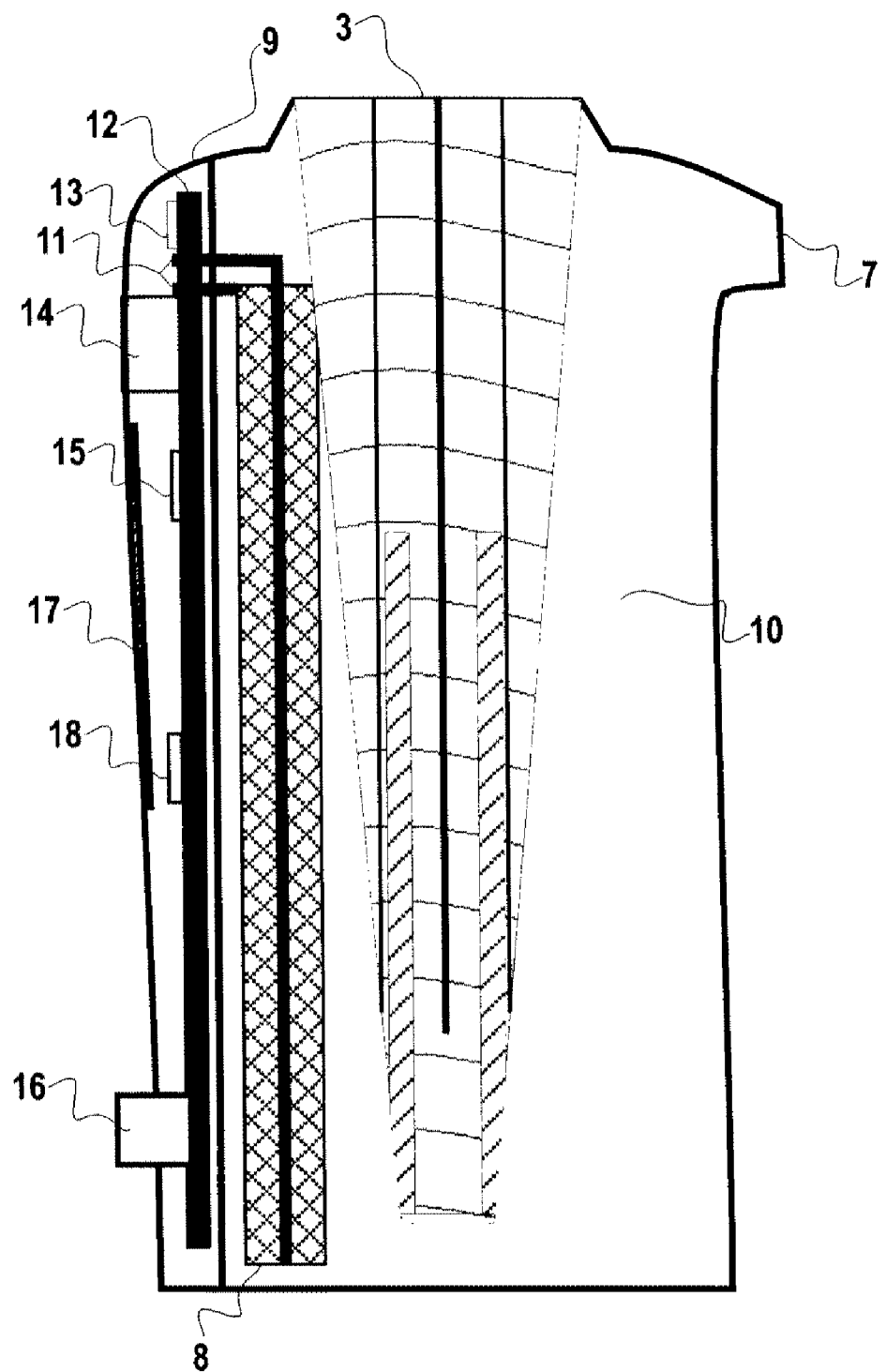
FIG. 2 is a schematic sectional side view of the embodiment of FIG. 1.

FIG. 1 shows a schematic front section view and FIG. 2 shows a schematic side section view of the apparatus of the present apparatus. FIG. 1 describes fragmentary, vertical sections of a cup like container 1 with a handle 2, a level sensor 8, controller 12, display 14 and external connector 16 of this apparatus mounted thereon. The level sensor 8 comprises an electrical capacitor oriented substantially vertically in the container 1 and is configured such that as liquid rises in the container 1, a capacitance of the capacitor changes.

In operation the liquid enters the container 1 via the open top of a funnel 3 mounted inside the measurement chamber of the container 1. Vertically oriented flanges 4 extend inward from walls of the funnel 3 toward a center thereof to reduce turbulence as the liquid from the spray nozzle enters at high speed under significant pressure, then the liquid enters the measurement chamber 10 via slots 5. The bottom of the funnel is closed 6. The liquid rises up level sensor 8, thus changing the capacitance. A processor circuit is connected to the capacitor and is operative to measure the change in capacitance of the capacitor and convert the change in capacitance into a rate of liquid flow into the container and a display is operative to display the rate of liquid flow to a user. When the measurement is complete the user empties the chamber 10 via the spout 7. A handle 2 is provided for ease of use.

In the illustrated embodiment the two conductors 11 from the sensor 8 are connected to the circuit board 12. Capacitance measuring circuits 13 convert the level to a digital signal which is passed to the micro-computer 15. The micro-computer 15 scales the measurement to a rate of flow and displays the results on the display 14 and stores them in the memory circuits 18. Connector 16 can be used to access the stored values by a PC computer or to connect a remote pressure sensor. Keypad 17 is mounted on the front cover 9 to allow user input and control.

Figure 3:
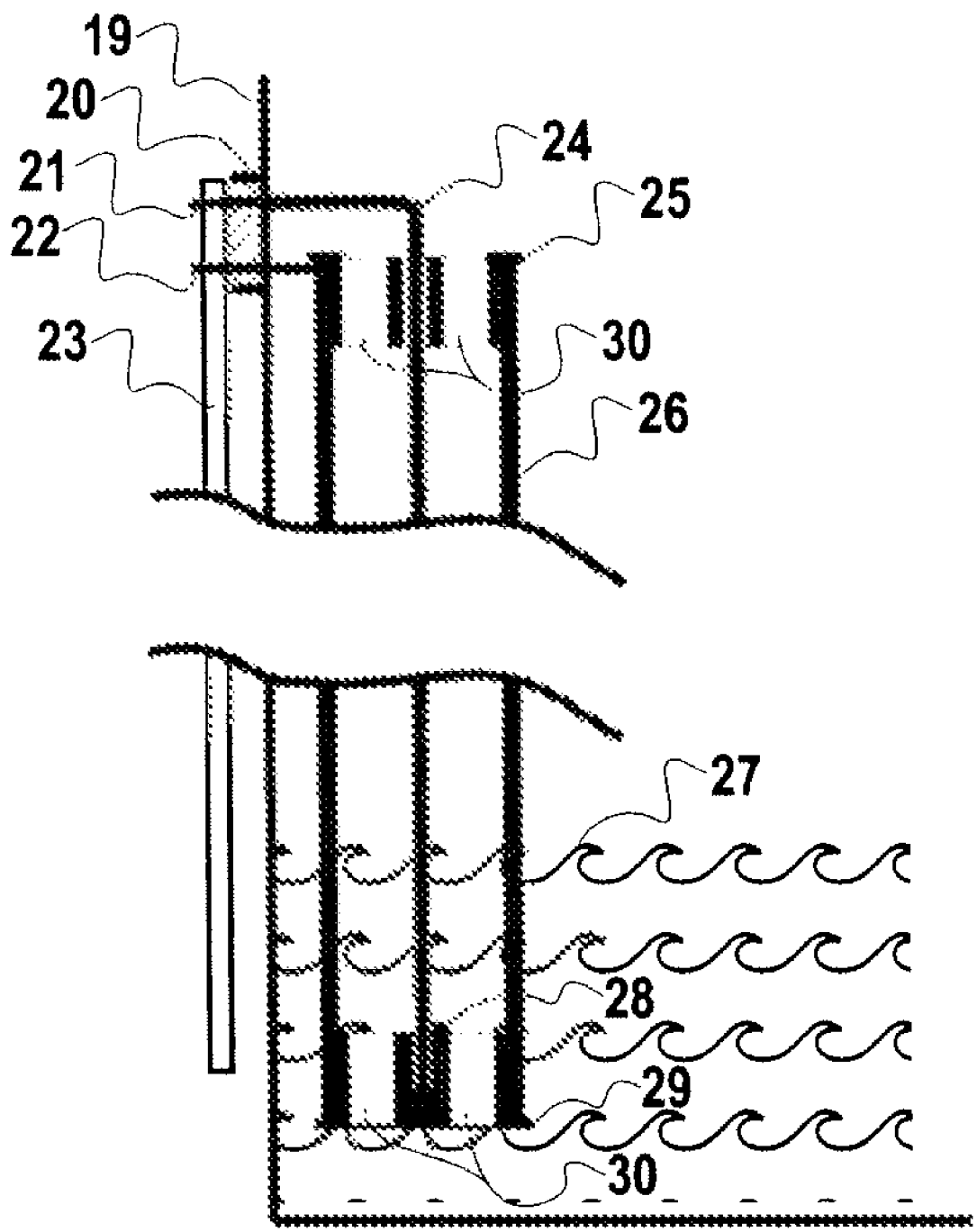
FIG. 3 is a schematic sectional side view of the sensor used in the embodiment of FIG. 1.

FIG. 3 shows a schematic fragmentary, section of the preferred embodiment of the sensor used in the apparatus. The sensor is made of an non-insulated hollow tube 26 made from an electrically conductive material, conveniently a metal. A non-conducting bottom end cap 29 which holds an insulated electrically conductive wire 21 centered in the tube 26 along an axis of the tube. A sealant adhesive 28 encapsulates the end of the insulated wire 21 in the end cap 29 thus preventing the liquid 27 from making electrical contact with the wire 24. A similar cap 25 is located at the top of the sensor to hold and center the insulated wire 21 at the top of the tube. Both caps contain openings 30 through which the liquid 27 can enter or exit the tube 26. The insulated wire 21 exits the chamber through the front wall 19 and a second non-insulated wire 22 is electrically connected to the tube 26 and also exits at this point. A sealant adhesive 20 encapsulates the two wires thus preventing the liquid from contacting the circuit board 23.

In operation the liquid 27 enters the tube 26 via the openings 30 in bottom cap 29. The liquid rises up the inside of the tube 26, thus changing the capacitance between the tube 26 and the wire 21. When the chamber is dumped, the liquid 27 flows out of the tube 26 via the openings 30 in both the top and bottom caps 25, 29. The preferred insulation 24 on the wire 21 has an outer surface adapted to shed liquid. For example a Teflon™ insulation limits the amount of liquid 27 that hangs up on it after the liquid 27 is dumped out.

Figure 4A:
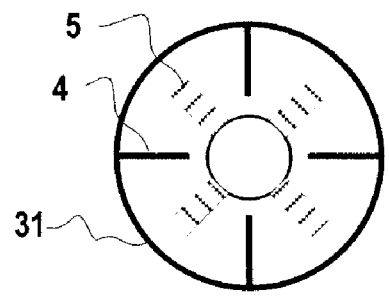
FIGS. 4A and 4B are respectively schematic top and side views of the funnel used in the embodiment of FIG. 1 to limit splashing and turbulence.
Figure 4B:
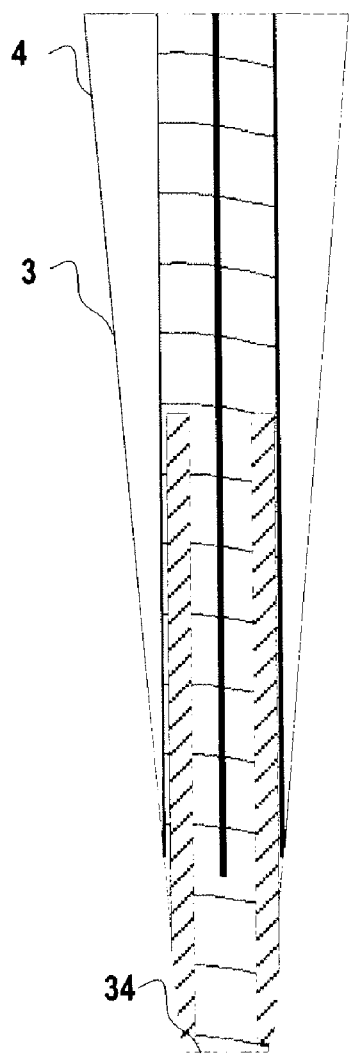

FIG. 4A, 4B show top and side section of the funnel 3 that limits splashing and turbulence in the chamber 10. A plastic cone shaped funnel 3 is mounted in the container such that it protrudes down the center of the measurement chamber 10. Means is provided to allow removal of the funnel 3 to facilitate cleaning. Four baffles 4 protrude from the inside wall of the funnel 3. These are arranged to prevent the liquid from swirling around as it enters the funnel 3. Four slots 5 pierce the wall of the funnel 3 to allow the liquid to enter the measurement chamber 10 in a controlled manner. The bottom 34 of the funnel 3 is closed.

Figure 5:
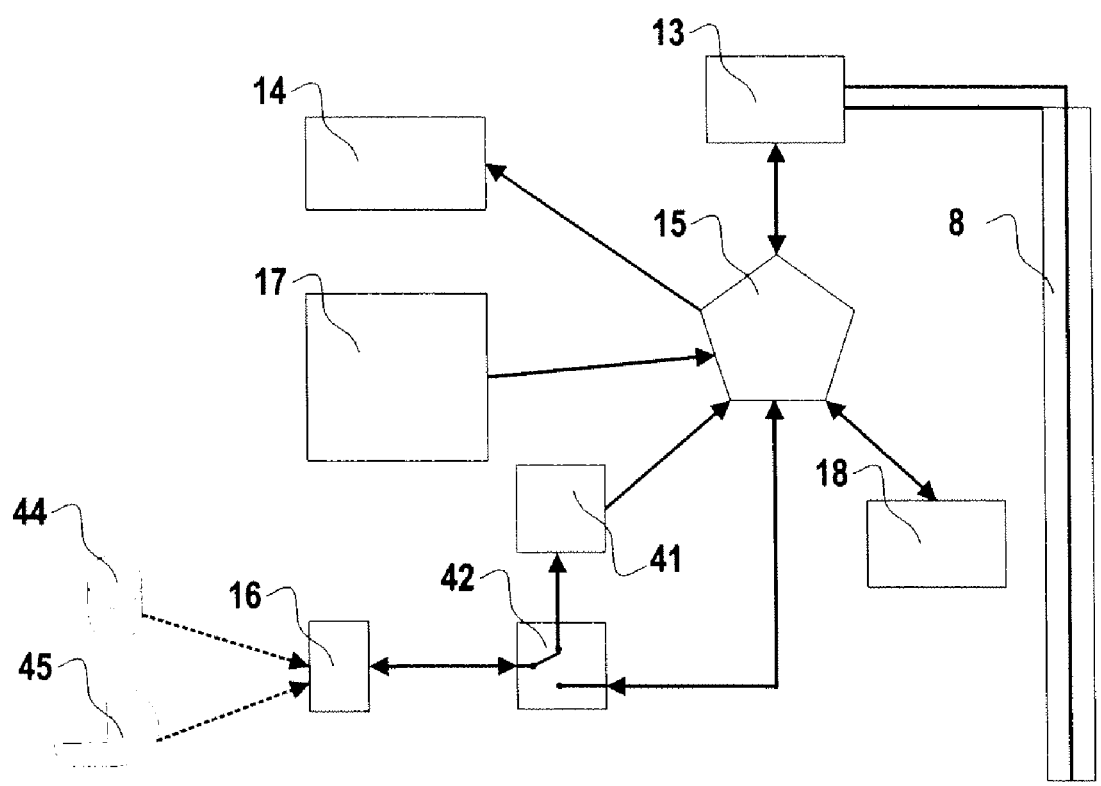
FIG. 5 is a block diagram of a prototypical system showing the major physical elements that are required to realize the invention.

FIG. 5 is a block diagram of a prototypical system. It shows the major physical elements that are required to realize the apparatus and the data flow within a prototypical apparatus. The apparatus contains 7 major blocks: sensor 8, capacitance measuring circuits 13, micro-computer 15, memory circuits 18, visual display 14, keypad 17, and connector 16.

The sensor 8 is directly connected to the capacitance measurement circuits 13. The capacitance measurement circuits 13 continuously measure the capacitance of the sensor 8 and pass the measurement to the micro-computer 15. The micro-computer 15 can cause the capacitance measurement circuits 13 to self calibrate when the sensor 8 is know to be empty or full. The micro-computer 15 stores the values in the memory 18. When sufficient measurements are recorded to detect the rate of change of the volume of liquid, the micro-computer 15 scales the measurements to a rate of flow, adds the value to a list on the display 14 and stores the computed value in the memory 18. The keypad 17 allows the user to turn the power to the apparatus on and off and to initiate calibration functions. The user may also enter the number of nozzles, sprayer speed and boom width so that the micro-computer 15 can calculate volume per area covered.

An optional pressure sensor 44 maybe attached to the connector 16 so that via an analog to digital converter 41, the micro-computer 15 can measure and store in memory 18 the nozzle pressure. When this option is connected, the switch 42 is made to connect the connector 16 to the analog to digital converter 41. Another option is to connect a computer 45 to the connector 16. This will allow the computer 45 to access the memory 18 via the micro-computer 15, thus allowing long term retention of the readings and calculation of long term trends. When this option is connected, the switch 42 is made to connect the connector 16 to the micro-computer 15.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An apparatus for measuring a rate of liquid flow through a spray nozzle, the apparatus comprising:
    a container with an opening in a top thereof adapted to receive a liquid discharge from a spray nozzle;
    a level sensor comprising an electrical capacitor oriented substantially vertically in the container and configured such that as liquid rises in the container, a capacitance of the capacitor changes;
    a processor circuit connected to the capacitor and operative to measure the change in capacitance of the capacitor and convert the change in capacitance into a rate of liquid flow into the container; and
    a display operative to display the rate of liquid flow.

2. The apparatus of claim 1 comprising a micro-computer operative to calibrate the level sensor at a level when the tube is empty.

3. The apparatus of claim 1 wherein the capacitor comprises:
    a hollow tube made from an electrically conductive material oriented substantially vertically inside the container;
    an electrically conductive wire extending through the tube substantially along an axis of the tube, and insulation covering the wire such that liquid in the container is prevented from contacting the wire;
    wherein top and bottom ends of the tube are open to allow liquid entering the container to rise in the tube.

4. The apparatus of claim 3 wherein the insulation has an outer surface adapted to shed liquid.

5. The apparatus of claim 1 a micro-computer operative to calibrate the level sensor at a level when the tube is filled with liquid.

6. The apparatus of claim 5 wherein the micro-computer is operative to store the rate of liquid flow from a plurality of measured spray nozzles.

7. The apparatus of claim 6 comprising an external connector adapted for connection of a computer to download stored data from the micro-computer.

8. The apparatus of claim 7 wherein the external connector is further adapted for connection of a pressure sensor operative to measure an output pressure of a spray nozzle being measured.

9. The apparatus of claim 1 comprising a cone-shaped funnel mounted under the opening in the top of the container such that a wide top end of the funnel is under the opening and such that the funnel tapers inward toward the bottom end thereof, the funnel including a plurality of slots along a length of a lower portion thereof, and wherein the liquid discharge from a spray nozzle enters the wide top end of the funnel and flows through the slots into the container, and up the capacitor.

10. The apparatus of claim 9 further comprising substantially vertically oriented flanges extending inward from walls of the funnel toward a center thereof.

11. The apparatus of claim 9 wherein a bottom end of the funnel is closed, and wherein the slots extend upward from the closed bottom end.

12. A method for measuring a rate of liquid flow through a spray nozzle, the method comprising:
   providing a container with an opening in a top thereof and directing liquid discharge from a spray nozzle into the opening; providing a level sensor comprising an electrical capacitor oriented substantially vertically in the container and configured such that as liquid rises in the container, a capacitance of the capacitor changes;
   with a processor circuit connected to the capacitor, measuring the change in capacitance of the capacitor and converting the change in capacitance into a to rate of liquid flow into the container; and
   displaying the rate of liquid flow.

13. The method of claim 12 comprising providing a micro-computer operative to calibrate the level sensor at a level when the tube is empty.

14. The method of claim 12 wherein the capacitor comprises:
   a hollow tube made from an electrically conductive material oriented substantially vertically inside the container;
   an electrically conductive wire extending through the tube substantially along an axis of the tube, and insulation covering the wire such that liquid in the container is prevented from contacting the wire;
   wherein top and bottom ends of the tube are open to allow liquid entering the container to rise in the tube.

15. The method of claim 14 wherein the insulation has an outer surface adapted to shed liquid.

16. The method of claim 12 comprising providing a micro-computer operative to calibrate the level sensor at a level when the tube is filled with liquid.

17. The method of claim 16 wherein the micro-computer is operative to store the rate of liquid flow from a plurality of measured spray nozzles.

18. The method of claim 17 comprising connecting a computer to the micro-computer and downloading stored data from the micro-computer to the computer.

19. The method of claim 17 comprising connecting a pressure sensor to measure an output pressure of a spray nozzle being measured and connecting the pressure sensor to the micro-computer to store the output pressure of the nozzle.

20. The method of claim 12 comprising providing a cone-shaped funnel mounted under the opening in the top of the container such that a wide top end of the funnel is under the opening and such that the funnel tapers inward toward the bottom end thereof, the funnel including a plurality of slots along a length of a lower portion thereof, and receiving the liquid discharge from a spray nozzle in the wide top end of the funnel such that the liquid flows into the funnel and through the slots into the container, and up the capacitor.

21. The method of claim 20 further comprising reducing turbulence in the container by providing substantially vertically oriented flanges extending inward from walls of the funnel toward a center thereof.

22. The method of claim 20 wherein a bottom end of the funnel is closed, and wherein the slots extend upward from the closed bottom end.

\* \* \* \* \*